US009412379B2

(12) United States Patent
Helm

(10) Patent No.: US 9,412,379 B2
(45) Date of Patent: Aug. 9, 2016

(54) METHOD FOR INITIATING A WIRELESS COMMUNICATION LINK USING VOICE RECOGNITION

(71) Applicant: Toyota Motor Engineering & Manufacturing North America, Inc., Erlanger, KY (US)

(72) Inventor: Sean L. Helm, Saline, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 65 days.

(21) Appl. No.: 14/488,046

(22) Filed: Sep. 16, 2014

(65) Prior Publication Data

US 2016/0078870 A1 Mar. 17, 2016

(51) Int. Cl.
G10L 17/22 (2013.01)

(52) U.S. Cl.
CPC ............................... G10L 17/22 (2013.01)

(58) Field of Classification Search
CPC ..... H04M 2250/02; H04M 1/6091; G10L 15/30; G10L 15/32
See application file for complete search history.

(56) References Cited

U.S. PATENT DOCUMENTS

| 6,138,100 | A | 10/2000 | Dutton et al. | |
|---|---|---|---|---|
| 7,184,960 | B2* | 2/2007 | Deisher | G10L 15/30 704/275 |
| 7,533,018 | B2 | 5/2009 | Ma et al. | |
| 8,131,556 | B2 | 3/2012 | Barton et al. | |
| 8,200,214 | B2* | 6/2012 | Chutorash | H04W 48/18 455/432.1 |
| 8,374,862 | B2 | 2/2013 | Bocking | |
| 8,392,411 | B2 | 3/2013 | Lebeau et al. | |
| 8,515,765 | B2* | 8/2013 | Baldwin | G10L 15/22 704/270 |
| 8,774,776 | B1* | 7/2014 | Ornstein | H04M 19/04 455/414.1 |
| 8,933,782 | B2* | 1/2015 | Pierfelice | H04L 63/10 340/5.82 |
| 8,942,888 | B2* | 1/2015 | Garrett | G06F 9/4443 340/426.17 |
| 9,042,875 | B2* | 5/2015 | Saito | H04W 76/06 455/345 |
| 9,096,234 | B2* | 8/2015 | Frye | B60R 16/023 |
| 9,132,715 | B2* | 9/2015 | Kalhous | B60H 1/00657 709/202 |
| 9,173,238 | B1* | 10/2015 | Bloomcamp | H04W 76/02 |
| 9,175,977 | B2* | 11/2015 | Murlidar | G01C 21/3688 |
| 9,185,734 | B2* | 11/2015 | Wang | H04W 76/023 |
| 9,197,336 | B2* | 11/2015 | Sigal | H04H 60/85 |

(Continued)

OTHER PUBLICATIONS

Kuhn, Thomas, et al. "Hybrid in-car speech recognition for mobile multimedia applications." Vehicular Technology Conference, 1999 IEEE 49th. vol. 3. IEEE, 1999.*

(Continued)

Primary Examiner — Matthew Baker
(74) Attorney, Agent, or Firm — Christopher G. Darrow; Darrow Mustafa PC

(57) ABSTRACT

A method for establishing a wireless mobile communication link between a vehicle communication system and a mobile network includes a vehicle communication system receiving a single continuous user verbal command string consisting of a first verbal command and at least a second verbal command. The first verbal command identifies a selected communication device for establishing the wireless mobile communication link. The communication device is selected from a group including at least two communication devices. The vehicle communication system determines if the selected communication device is communicatively connected to the vehicle communication system and proceeds to establish the wireless mobile communication link using the selected communication device.

20 Claims, 5 Drawing Sheets

(56) References Cited

U.S. PATENT DOCUMENTS

| | | | | |
|---|---|---|---|---|
| 9,218,805 B2* | 12/2015 | Elliott | | G10L 15/00 |
| 2001/0048749 A1* | 12/2001 | Ohmura | | H04B 1/20 |
| | | | | 381/86 |
| 2004/0002866 A1* | 1/2004 | Deisher | | G10L 15/30 |
| | | | | 704/275 |
| 2004/0063471 A1* | 4/2004 | Kindo | | H04M 1/6091 |
| | | | | 455/566 |
| 2004/0198464 A1* | 10/2004 | Panian | | H04M 1/6066 |
| | | | | 455/569.1 |
| 2004/0264387 A1* | 12/2004 | Gibeau | | B60R 16/0315 |
| | | | | 370/254 |
| 2007/0140187 A1* | 6/2007 | Rokusek | | H04L 67/16 |
| | | | | 370/338 |
| 2007/0217396 A1 | 9/2007 | Su | | |
| 2010/0041397 A1* | 2/2010 | Chutorash | | H04W 48/18 |
| | | | | 455/432.1 |
| 2010/0137037 A1* | 6/2010 | Basir | | H04M 1/6091 |
| | | | | 455/569.1 |
| 2010/0144401 A1* | 6/2010 | Azuma | | H04M 1/6091 |
| | | | | 455/569.2 |
| 2010/0210212 A1* | 8/2010 | Sato | | H04B 5/02 |
| | | | | 455/41.3 |
| 2013/0121502 A1* | 5/2013 | Fujii | | H04R 27/00 |
| | | | | 381/77 |
| 2014/0141723 A1* | 5/2014 | Wang | | H04W 76/023 |
| | | | | 455/41.2 |
| 2014/0155110 A1* | 6/2014 | Park | | H04W 76/02 |
| | | | | 455/458 |
| 2014/0297900 A1* | 10/2014 | Herbert | | G06F 11/3051 |
| | | | | 710/16 |
| 2015/0199965 A1* | 7/2015 | Leak | | G10L 15/22 |
| | | | | 704/249 |
| 2015/0255063 A1* | 9/2015 | Talwar | | H04M 1/27 |
| | | | | 704/255 |

OTHER PUBLICATIONS

Wang, Yi, et al. "A framework of energy efficient mobile sensing for automatic user state recognition." Proceedings of the 7th international conference on Mobile systems, applications, and services. ACM, 2009.*

* cited by examiner

METHOD FOR INITIATING A WIRELESS COMMUNICATION LINK USING VOICE RECOGNITION

BACKGROUND

The ability for individuals to communicate with one another has never been greater. Wireless communication technology, such as cellular networks, provides widespread communication connectivity throughout the world. A large portion of the world's population now possesses a mobile communication device. The devices are typically capable of providing access to telephone services as well as accessing the Internet. In response to the surge in mobile communications, many automotive vehicles now include communication systems that include integrated, hands-free systems to utilize a consumer's cellular phone, via for example, a Bluetooth link, or use an integrated transceiver for establishing a communication link. Bluetooth hands-free options may be provided as part of the vehicle's audio system, or in after-market stereo system units. This option may utilize the vehicle's speakers to transmit a caller's voice in the phone call and include a microphone associated with the vehicle's audio system or located elsewhere in the vehicle, such as a steering wheel. The vehicle may include a voice recognition system that enables a user to activate and control various vehicle systems and establish communication links with off board wireless networks by way of verbal commands. The voice recognition system is typically configured to recognize a predetermined set of verbal commands. If the user recites a verbal command not recognized by the voice recognition system the user may be prompted for additional information in order to complete the desired task. Multiple discrete verbal commands may be required to complete a particular task, such as initiating a phone call. The verbal commands may be in response to prompts from the vehicle's audio system. For example, an operator may make a verbal request to call a person identified in the operator's contact list. If multiple devices are available for establishing the wireless communication link for the phone call, such as multiple mobile phones, the audio system may prompt the operator to select a mobile device to use for establishing the communication link for the phone call. Having to provide multiple verbal commands in response to system prompts to complete a task, such as initiating a phone call over a selected wireless communication device, may be unnecessarily cumbersome and inconvenient for the user. This may be reduced by enabling a user to verbally provide the information needed for the vehicle communication system to establish the requested wireless communication link in single continuous command string without having to prompt the user for additional information.

SUMMARY

Disclosed is a method for establishing a wireless mobile communication link between a vehicle communication system and a mobile network in response to a single continuous user verbal command string. The command string may include multiple discrete commands combined into a single continuous command string. The verbal command string may be detected by the vehicle communication system and parsed into discrete executable commands. At least one of the discrete commands selects a communication device for use in establishing the wireless mobile communication link. The communication device may be selected from a group including at least two communication devices. The vehicle communication system may determine if the selected communication device is communicatively connected to the vehicle communication system and then proceeds to establish the wireless mobile communication link using the selected communication device.

BRIEF DESCRIPTION OF THE DRAWINGS

The various features, advantages and other uses of the present apparatus will become more apparent by referring to the following detailed description and drawings, in which.

DETAILED DESCRIPTION

Figure 1:
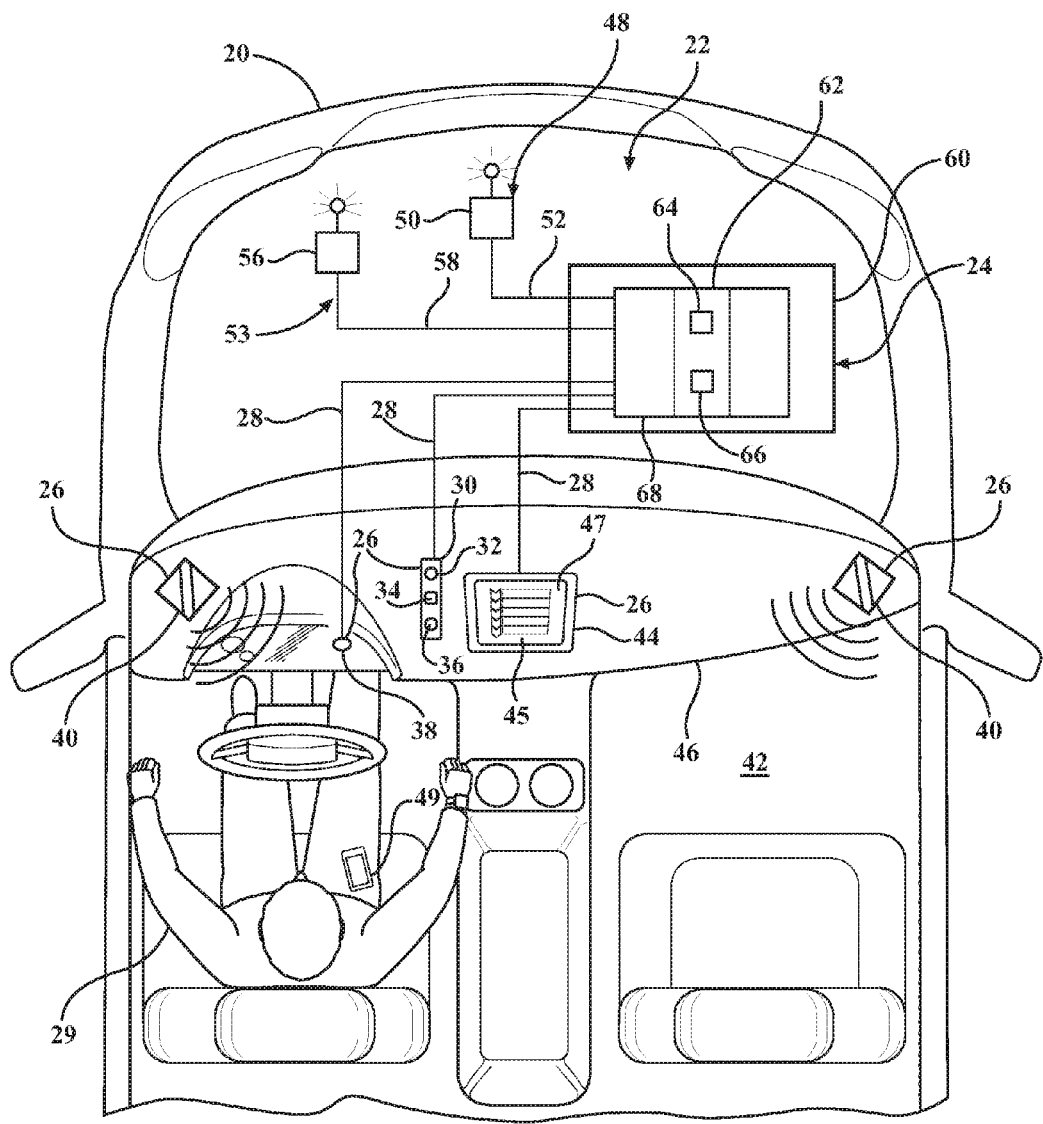
FIG. 1 is a schematic illustration of an automotive vehicle employing an exemplary voice actuated communication system for establishing a communication link over any of multiple available wireless communication devices in response to a single verbal command string.

A system and method for verbally initiating a wireless communication link using a single continuous verbal command string is disclosed. The verbal command string includes information required by a vehicle on-board communication system to initiate the requested communication link. The information includes selecting one of multiple available communication devices that are communicatively connected to the communication system with which to establish the requested communication link.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the exemplary disclosed systems and methods. Further, the descriptions set forth herein are not intended to be exhaustive or otherwise limit or restrict the claims to the precise forms and configurations shown in the drawings and disclosed in the following detailed description.

FIG. 1 schematically illustrates a vehicle 20 employing a voice actuated communication system 22 configured to selectively establish a wireless mobile communication link in response to a user's verbal command string consisting of a multiple discrete commands strung together in a single continuous string. The wireless mobile communication link may be used, for example, to transmit and receive data and provide a wireless conduit for phone calls. The single continuous verbal command string provides may provide all the information required by the voice actuated communication system 22 to establish the wireless mobile communication link without the voice actuated communication system 22 having to prompt the user for additional information. For example, the single continuous command string can identify the person to call (e.g., a person listed in the user's contact list); the phone number to call if the person has multiple phone numbers (e.g., home, office, mobile, etc.); and specify which of multiple available communication devices communicatively connected to the voice actuated communication system 22 to use to establish the wireless communication link (e.g., a first mobile phone, a second mobile phone, a vehicle integrated wireless communication system, etc.) The voice actuated communication system 22 may include a voice recognition system configured to recognize the user's verbal command string and establish the requested wireless mobile communication link in accordance with the user's instructions. The ability to initiate a wireless mobile communication link over any one of multiple wireless communication devices using a single command string is more expedient and convenient than performing the same task using multiple discrete commands in response to communication system prompts.

With continued reference to FIG. 1, the voice actuated communication system 22 may include a vehicle computing device 24 and other operably interconnected components. For example, the voice actuated communication system 22 may generally include input/output hardware 26 communicatively coupled to the vehicle computing device 24 through one or more communication links 28. The input/output hardware 26 serves as an interface between a user and the voice actuated communication system 22. As used herein, the term "user" refers generally to a driver 29 operating the vehicle 20 and any other person present within the vehicle. The input/output hardware 26 may include any device capable of transforming tactile and/or audio inputs into an electrical signal capable of transmission via the communication links 28, and/or transforming electrical signals into visual and/or audio outputs that may be sensed by the user. Each individual component of the input/output hardware 26 may include one or more processors and one or more memories. Alternatively, each individual component of the input/output hardware 26 may be configured without a processor and/or a memory. Multiple individual input/output hardware 26 components may be integrated into a single unit.

The input/output hardware 26 may include, for example, a tactile input device 30, which may include various input controls, for example, a button 32, a switch 34, a knob 36, or the like. The physical motion of the input controls on the tactile input device 30 can be transmitted to the computing device through the communication link 28.

The input/output hardware 26 may further include a microphone 38 for receiving verbal input from the user and a speaker 40 for transforming electrical signals into sound that can be heard by the user. The microphone 38 may be any sensor that transforms sound waves into an electrical signal. The microphone 38 may be located within a passenger compartment 42 of the vehicle 20 at a location suitable for receiving verbal input from the user. The speaker 40 and microphone 38 may be part of a vehicle audio system 41 (see FIG. 2).

The input/output hardware 26 may further include one or more displays 44 for visually presenting data. The display 44 may be located within the passenger compartment 42 of the vehicle 20, for example, in a dash panel 46. The display 44 may employ any of various display technologies capable of transmitting a visual output, and may include a touch screen 45 capable of detecting the presence and location of a tactile input on a surface 47 of the display 44. The display 44 may be configured to receive mechanical input directly upon the optical output provided by the display 44.

The voice actuated communication system 22 may employ a personal area network (PAN) 48 for wirelessly transmitting data between a mobile communication device, such as a mobile phone 49 or other mobile computing device, and vehicle computing device 24. Various wireless technologies may be employed, such as Bluetooth, IrDA, Wireless USB, Z-Wave, ZigBee, and other near field communication protocols. A PAN interface hardware 50 configured for transmitting and receiving data over the PAN 48 may be communicatively connected to the vehicle computing device 24 though a PAN communication link 52. The PAN interface hardware 50 may include a transmitter for wirelessly transferring data from the vehicle computing device 24 to a communicatively connected mobile communication device and a receiver for receiving and wirelessly transferring data from the communicatively connected mobile communication device to the vehicle computing device 24. Accordingly, the PAN interface hardware 50 may include an antenna and/or other communication transceiver for sending and/or receiving any wireless communication between the communicatively connected mobile communication device and the vehicle computing device 24.

Figure 2:
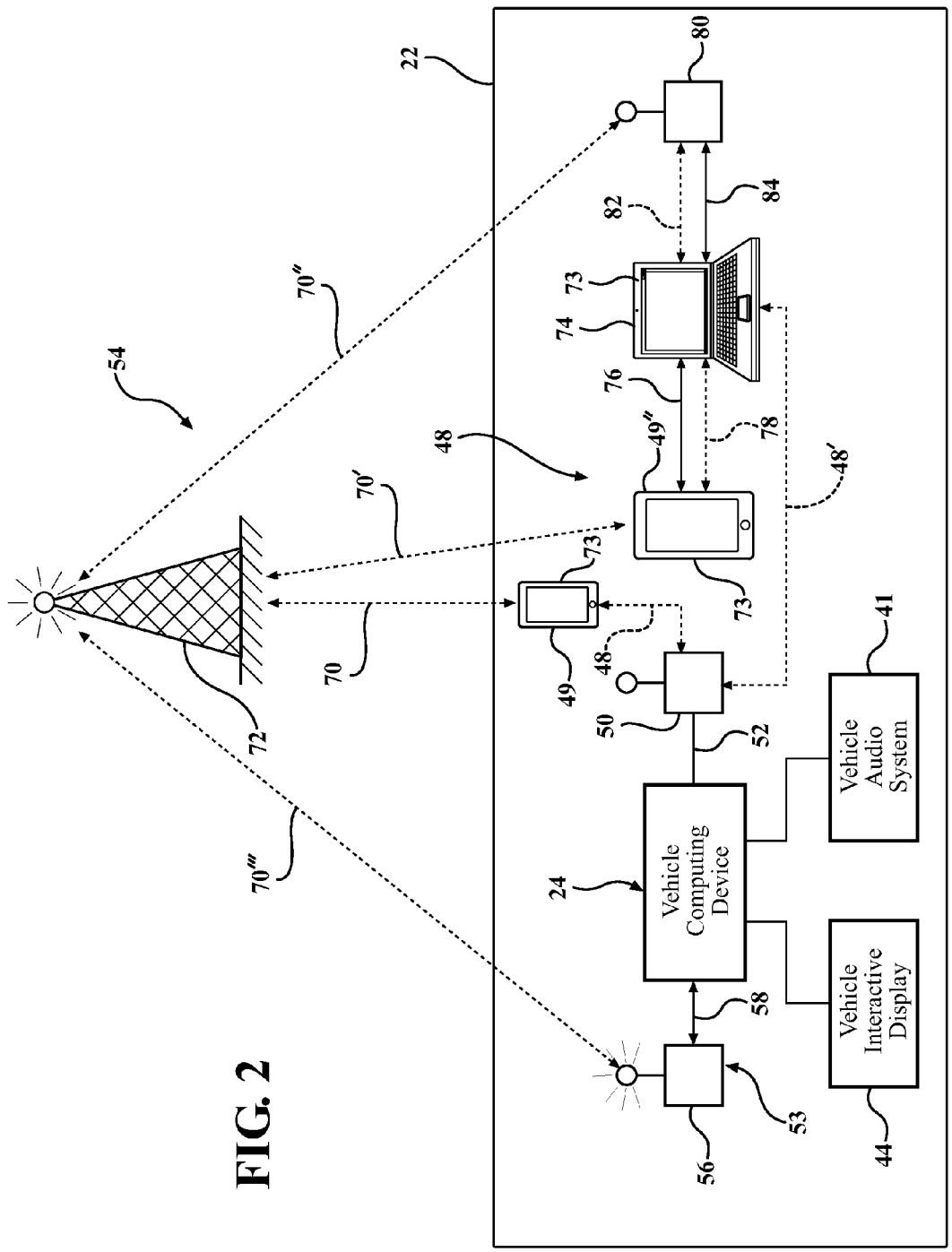
FIG. 2 is a schematic illustration of the voice actuated communication system electronically connected to multiple communication devices via wireless communication links.

With reference to FIGS. 1 and 2, the voice actuated communication system 22 may employ an integrated mobile communication system 53 that may include variously configured communication hardware for wirelessly transmitting data between the vehicle computing device 24 and a mobile network 54, such as a cellular network. The mobile network 54 enables the vehicle computing device 24 to wirelessly communicate with other devices connected to the mobile network 54.

The voice actuated communication system 22 may include an integrated mobile network transceiver 56 configured to transmit and receive data over the mobile network 54. The mobile network transceiver 56 may be communicatively connected to the vehicle computing device 24 though a mobile network transceiver communication link 58. The mobile network transceiver 56 may include a transmitter for wirelessly transferring data from the vehicle computing device 24 to the mobile network 54 and a receiver for wirelessly transferring data from the mobile network 54 to the vehicle computing device 24.

With continued reference to FIGS. 1 and 2, the vehicle computing device 24 may include a processor 60 communicatively coupled with a memory 62. The processor 60 may include any device capable of executing machine-readable instructions, which may be stored on a non-transitory computer-readable medium, for example memory 62. Processor 60 may include a controller, an integrated circuit, a microchip, a computer, and/or any other computing device. The memory 62 may include any type of computer readable medium suitable for storing data 64 and algorithms 66, which may include voice recognition software. For example, the memory 62 may include RAM, ROM, a flash memory, a hard drive, and/or any device capable of storing machine-readable instructions. The vehicle computing device 24 may also include an input/output interface 68 for facilitating communication between the processor 60, input/output hardware 26, the PAN network interface hardware 50 and the mobile network transceiver 56. Although the vehicle computing device 24 is schematically illustrated as including a single processor 60 and a single memory 62, in practice the vehicle computing device 24 may include a plurality of components, each having one or more memories and/or processors that may be communicatively coupled with one or more of the other components. Thus, the exemplary configurations described herein may utilize a distributed computing arrangement to perform any portion of the logic described herein. The vehicle computing device 24 may be a separate stand-alone unit, or may be configured as part of a central vehicle control system.

With particular reference to FIG. 2, PAN 48 is operable to communicatively couple the vehicle computing device 24 with one or more mobile communication devices 73 that may be used to establish a wireless mobile communication link 70 between the voice actuated communication system 22 and the mobile network 54. The mobile network 54 may be served by at least one fixed-location transceiver or base station 72. The mobile communication devices 73 may include one or more mobile phones 49 and mobile computing devices 74, which may include, for example, a personal computer, laptop computer, tablet computer, and personal digital assistant (PDA). Each of the one or more mobile communication devices 73 can include one or more processors and one or more memories. The one or more processors can execute logic to wirelessly connect the vehicle computing device 24 to the mobile network 54.

With continued reference to FIG. 2, the mobile communication devices 73 may be individually capable of independently establishing the wireless mobile communication link 70, or multiple mobile communication devices 73 may operably cooperate with one another to establish the wireless mobile communication link 70. For example, mobile phone 49 may be communicatively connected to vehicle computing device 24 via PAN 48. Mobile phone 49 is operable to establish the wireless mobile communication link 70 between the mobile network 54 and the voice actuated communication system 22.

Similar to mobile phone 49, mobile computing device 74 may be communicatively connected to the vehicle computing device 24 via a PAN wireless communication link 48'. The mobile computing device 74 may include communication software and/or hardware, such as Skype, but may lack the capability to directly establish a wireless mobile communication link with the mobile network 54. It may be possible, however, to use another mobile device communicatively connected to the mobile computing device 74, such as a mobile phone 49'', to establish a wireless mobile communication link 70' with the mobile network 54. The mobile phone 49'' may be communicatively connected directly to the mobile computing device 74 via a wired communication link 76 or a wireless communication link 78. The wireless communication link 78 may employ various wireless technologies, such as Bluetooth, IrDA, wireless USB, Z-Wave, ZigBee, and other known or unknown near field communication protocols. Alternatively, a mobile hotspot transceiver 80 may be employed for communicatively connecting the mobile computing device 74 to the mobile network 54. The mobile hotspot transceiver 80 operates to establish a wireless mobile communication link 70'' between the mobile computing device 74 and the mobile network 54. The mobile hotspot transceiver 80 may use Wi-Fi technology, or another communication protocol, for establishing a wireless communication link 82 between the mobile computing device 74 and the mobile hotspot transceiver 80. Alternatively, the mobile computing device 74 may be communicatively connected directly to the mobile hotspot transceiver 80 through a wired communication link 84.

With continued reference to FIG. 2, voice actuated communication system 22 may include the previously described integrated mobile communication system 53. The system's mobile network transceiver 56 may be configured to communicatively connect vehicle computing device 24 wirelessly to the mobile network 54 via a wireless mobile communication link 70'''. The mobile network transceiver 56 may be communicatively connected to the vehicle computing device 24 though the mobile network transceiver communication link 58. The integrated mobile communication system 53 may provide a primary or alternate means for communicatively connecting the vehicle computing device 24 to the mobile network 54.

The vehicle computing device 24 is capable of determining which of the mobile communication devices 73 and the integrated mobile communication system 53 are communicatively connected to the vehicle computing device 24. A user may select any one of the available mobile communication devices 73, or the integrated mobile communication system 53, with which to establish the wireless mobile communication link 70 to the mobile network 54. This may be accomplished, for example, by activating the vehicle's voice recognition system and verbally instructing the voice actuated communication system 22 regarding which of the available mobile communication devices 73 or the integrated mobile communication system 53 to use to establish the wireless mobile communication link 70.

Figure 3:
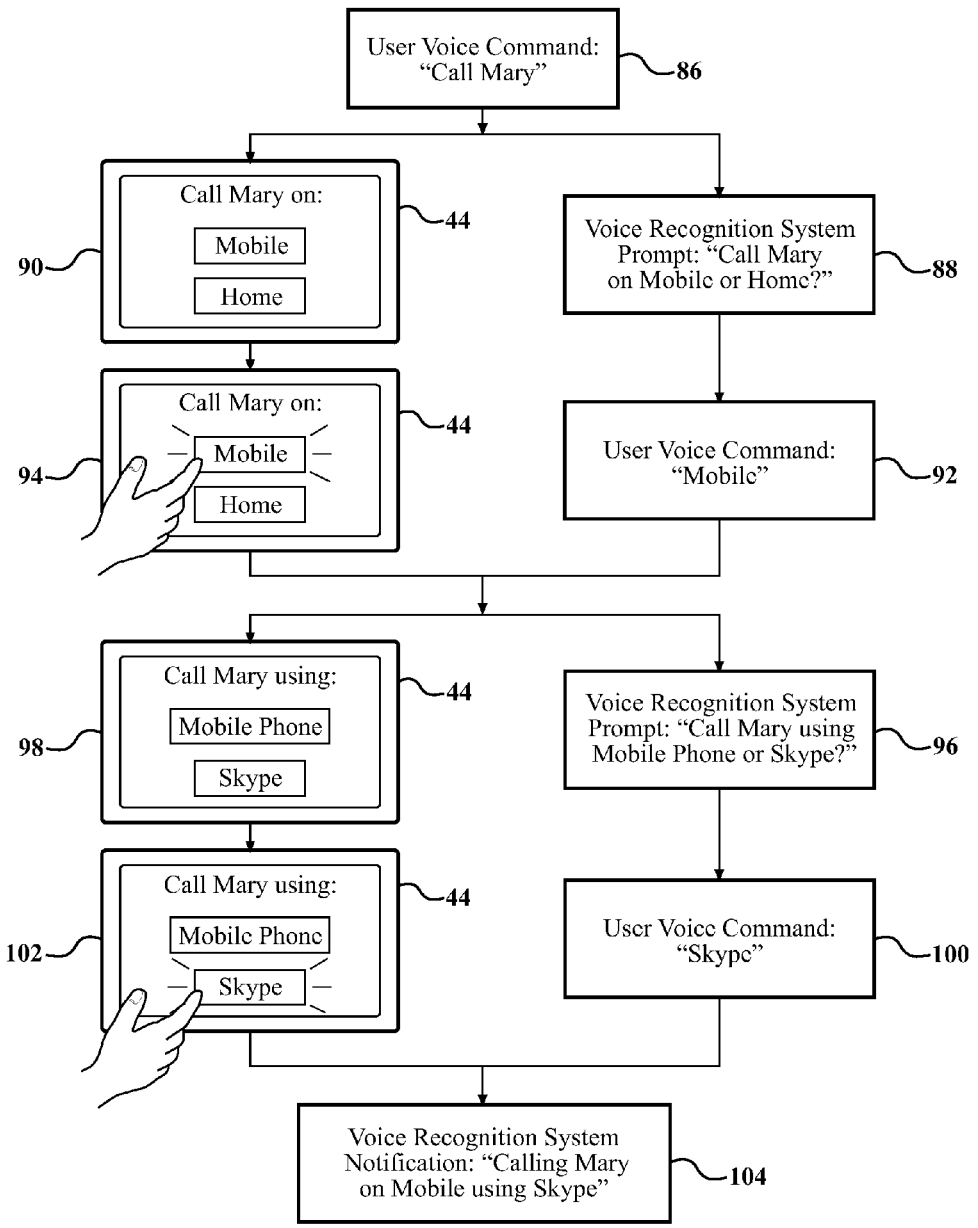
FIG. 3 illustrates an exemplary command sequence for initiating a wireless communication link over a selected wireless communication device.

With reference to FIG. 3, an exemplary user command sequence for establishing the wireless mobile communication link 70 is illustrated. In this example, the illustrative command sequence provides instructions to the voice actuated communication system 22 for initiating a wireless phone call. In practice, other command sequences providing instructions to the voice actuated communication system 22 to perform other tasks may also be employed. The command sequence may include the user activating the voice recognition system followed by a verbal command 86, for example, "Call Mary". The vehicle computing device 24 is configured to recognize upon receipt of the verbal command 86 that additional information is required from the user to initiate the requested wireless phone call. This may cause the voice actuated communication system 22 to issue an audio prompt 88 through the vehicle audio system 41 and/or visual prompt 90 using display 44. For example, if "Mary" has more than one contact phone number, the voice actuated communication system 22 may request the user to select which phone number to call "Mary". The user may respond to the voice actuated communication system prompt by providing a verbal response 92 or by performing a tactile selection 94, which may include physically touching the desired selection displayed on display 44.

If more than one mobile communication device 73 is available for establishing the wireless mobile communication link 70 to the mobile network 54, the voice actuated communication system 22 may further prompt the user to identify which of the available communication devices 73 or the integrated mobile communication system 53 to use to initiate the requested phone call. For example, the integrated mobile communication system 53 may employ communication software, such as Skype, capable of establishing the wireless mobile communication link 70. There may also be one or more mobile communication devices 73 communicatively connected to the vehicle computing device 24, such as mobile phone 49. This may cause the voice actuated communication system 22 to prompt the user to select one of the available communication devices to initiate the phone call. The communication system prompt may include the voice actuated communication system 22 issuing an audio prompt 96 requesting that the user select one of the mobile phone 49 or Skype (i.e., the integrated mobile communication system 53) with which to establish the wireless mobile communication link 70. The communication system prompt may also include providing a visual prompt 98 on display 44. The user may respond to the voice actuated communication system prompt by providing a verbal response 100 or by performing a tactile selection 104, which may include physically touching the desired selection displayed on display 44. In the illustrated example, the user selects "Skype" (i.e., the integrated mobile communication system 53) with which to establish the wireless mobile communication link 70.

When the user has provided the voice actuated communication system 22 with the information required to initiate the requested wireless phone call, the voice actuated communication system 22 may issue an audio and/or visual notification 104 informing the user that the phone call is being initiated as requested. The audio notification may be issued using speakers 40 and the visual notification may be issued using display 44.

The exemplary command sequence illustrated in FIG. 3, wherein the user provides discrete commands in response to communication system prompts may be cumbersome and inconvenient for the user. To help streamline the process, the voice actuated communication system 22 is configured to enable the user to provide a single continuous verbal command string including all the information required for the voice actuated communication system 22 to perform the requested task. For example, with reference to FIG. 4, the multiple discrete user commands for initiating a phone call illustrated in FIG. 3 (e.g., verbal command 86, verbal response 92 and verbal response 100), may be combined into a single continuous verbal command string 106 decipherable by the voice actuated communication system's voice recognition system. The single continuous verbal command string 106 may include information required for the voice actuated communication system 22 to perform the requested task, which in this example includes initiating a mobile phone call. The single continuous verbal command string 106 may include, for example, the verbal command string "Call Mary on Mobile using Skype". The verbal command string includes the information needed by the voice actuated communication system to initiate the phone call, including the person to call (e.g., "Mary"), the phone number to call (e.g., "Mobile"), and the communication device to use to establish the wireless mobile communication link 70 (e.g., "Skype"). In the exemplary command sequence illustrated in FIG. 3, the same information was provided in a less streamlined manner by having the user respond to multiple communication system prompts.

Figure 4:
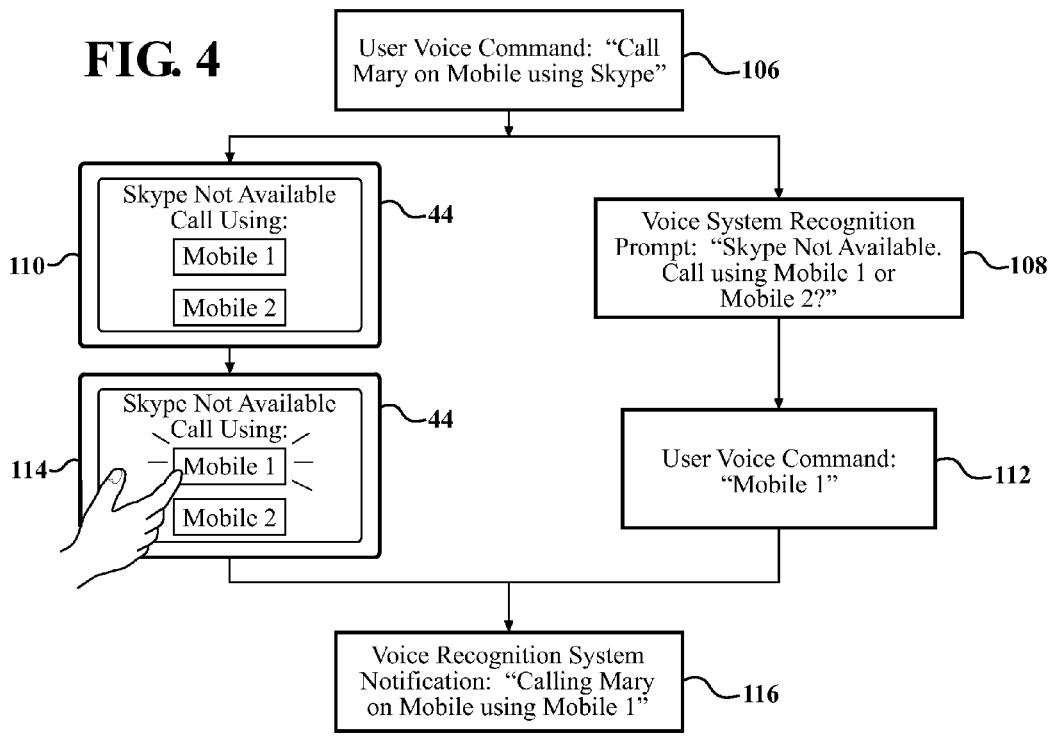
FIG. 4 illustrates an exemplary command sequence for initiating a wireless communication link in response to a single continuous verbal command string.

With continued reference to FIG. 4, the voice actuated communication system 22 is configured to determine which of the mobile communication devices 73 and the integrated mobile communication system 53 are communicatively connected to the vehicle computing device 24. If the voice actuated communication system 22 determines the requested communication device (in this example, integrated mobile communication system 53 employing "Skype"), is not available to establish the wireless mobile communication link 70, the voice actuated communication system 22 may prompt the user to request an alternate communication device. The communication system prompt may include, for example, an audio prompt 108 broadcast from vehicle audio system 41 notifying the user that the requested "Skype" is not available, and to select between other available communication devices, in this example, "Mobile 1" or "Mobile 2". The voice actuated communication system 22 may similarly provide a visual prompt 110 on display 44 requesting the user to select one of the available communication devices. The user may respond to the communication system prompt by providing a verbal response 112 or by performing a tactile selection 104, which may include physically touching the desired selection displayed on display 44. In the illustrated example, the user selects communication device "Mobile 1" for establishing the wireless mobile communication link 70.

When the user has provided the voice actuated communication system 22 with the information required to initiate the requested phone call, the voice actuated communication system 22 may issue an audio and/or visual notification 116 informing the user that the phone call is being initiated as requested. The audio notification may be broadcast using the speakers 40, and the visual notification may be transmitted using display 44.

Figure 5:
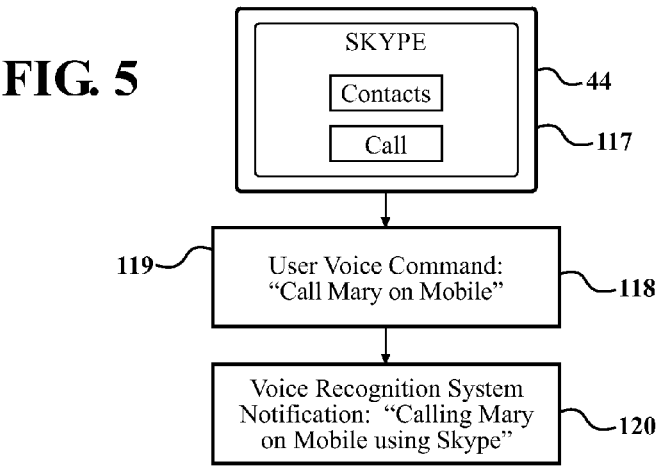
FIG. 5 illustrates an exemplary command sequence for initiating a communication link over a preselected communication device.

With reference to FIG. 5, the voice actuated communication system 22 may be configured to enable a user to preselect the communication device to use for establishing the wireless mobile communication link 70. For example, the user may intend on using the integrated mobile communication system 53 to establish the wireless communication link 70, and associated communication software, such as Skype, to initiate the phone call. At step 117, the user may preselect the integrated mobile communication system 53 by navigating to the "Skype" menu on display 44. The user may then issue a verbal command 118 (step 119) instructing the voice actuated communication system 22 to perform the requested task, for example call "Mary" on her mobile phone. Since no additional information is required from the user, the voice actuated communication system 22 may issue an audio and/or visual notification 120 informing the user that the phone call is being initiated as requested. The audio notification may be broadcast using the speakers 40, and the visual notification may be transmitted using display 44.

Figure 6:
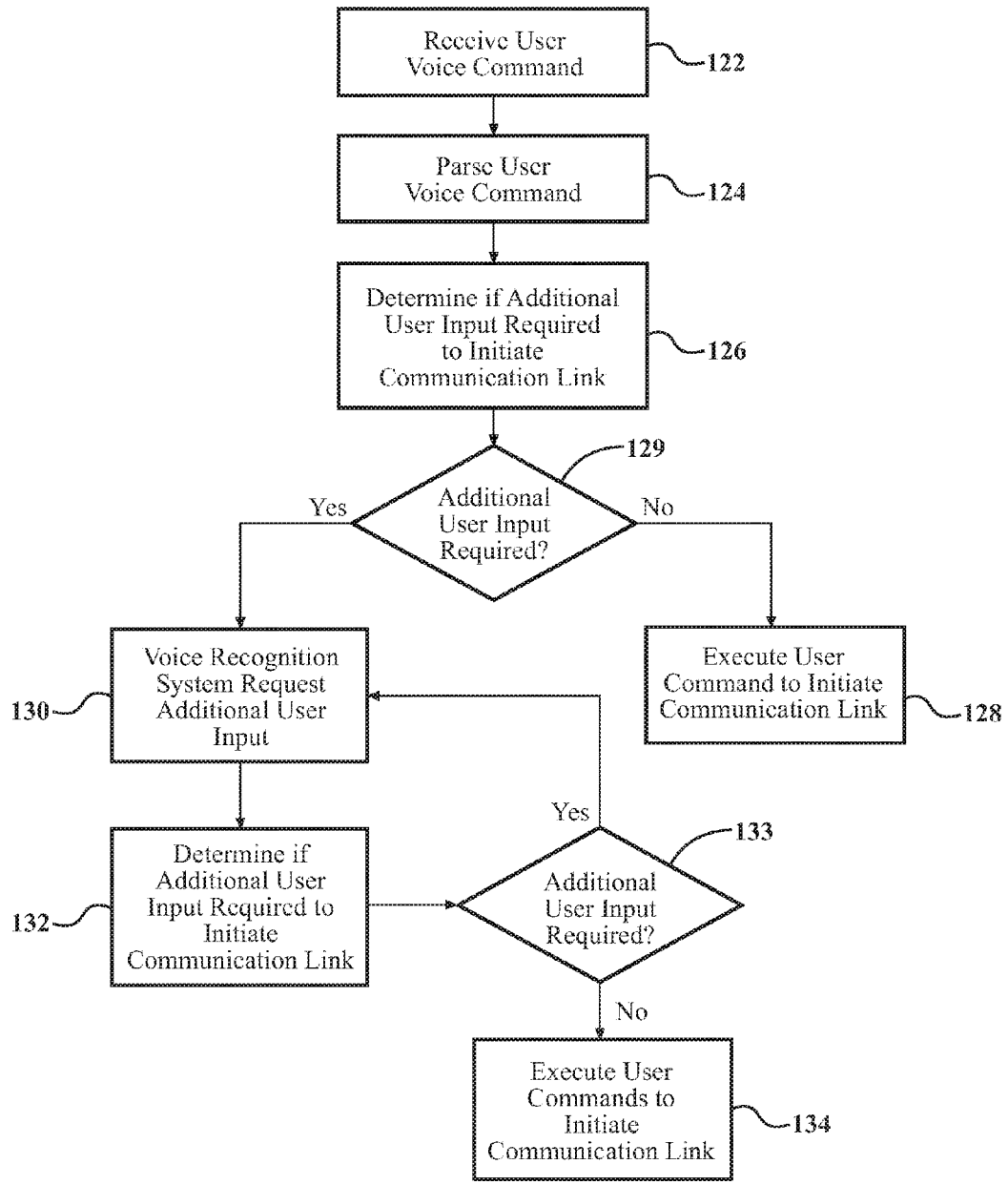
FIG. 6 illustrates and exemplary method for initiating a communication link using a selected communication device.

With reference to FIG. 6, an exemplary method for establishing a wireless mobile communication link 70 using a selected communication device is illustrated. The process may be initiated by the user activating the communication system's voice recognition system and issuing a verbal command string providing instructions to the voice actuated communication system 22, for example to initiate a wireless phone call. The user command string is preferably formatted as a single continuous command string including information required by the voice actuated communication system 22 to establish the wireless mobile communication link 70. For example, the user command string may identify the person to call, the phone at which to call the person, and the communication device with which to establish the wireless mobile communication link 70. The user command string may be received by the voice actuated communication system 22 (step 122), which may proceed to parse the user voice command string into its discrete commands (step 124). At step 126, the voice actuated communication system 22 determines if any additional information is required from the user to perform the requested task. If no additional information is required, the voice actuated communication system 22 proceeds to execute the user command string (step 128) and establish the requested communication link. If the voice actuated communication system 22 determines that additional information is required from the user to perform the requested task (step 129), the voice actuated communication system 22 may prompt the user for the additional information (step 130). Upon receipt of additional information from the user, the voice actuated communication system 22 may again determine if further additional information is required from the user (step 132). If no additional information is required (step 133) the voice actuated communication system 22 will proceed to execute the user verbal commands and establish the requested wireless mobile communication link (step 134). If the voice actuated communication system 22 determines that still more additional information is required to perform the requested task, the voice actuated communication system 22 will once again prompt the user to provide the additional information (step 130). This process will continue until the user has provided all information required for the voice actuated communication system 22 to establish the requested wireless mobile communication link 70.

It is intended that the scope of the present methods and apparatuses be defined by the following claims. However, it must be understood that the disclosed systems and methods for initiating a wireless communication link using voice recognition may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A method for establishing a wireless mobile communication link between a vehicle communication system and a mobile network, the method comprising:
   receiving a single continuous user verbal command string including a first command and at least a second command, wherein the first command includes a selection of a communication device for establishing the wireless mobile communication link;
   determining the selected communication device is not communicatively connected to the vehicle communication system;
   issuing a notification identifying alternate communication devices; and
   receiving a selection of an alternate communication device from the identified alternate communication devices.

2. The method of claim 1, wherein the communication device is selected from a group including at least two communication devices.

3. The method of claim 1, wherein the communication device includes one of a mobile phone, a mobile computing device and a mobile communication system integrated with the vehicle communication system.

4. The method of claim 1 further comprising communicatively connecting the selected alternate communication device to the vehicle communication system.

5. The method of claim 1, wherein the second command includes a selection of a phone number with which to connect over the wireless mobile communication link.

6. The method of claim 1, wherein the second command includes a selection of a contact from a user's contact list.

7. The method of claim 1 further comprising:
   issuing a notification that the first and second commands have been executed.

8. A method for establishing a wireless mobile communication link between a vehicle communication system and a mobile network, the method comprising:
   receiving a single continuous user verbal command string detectable by the vehicle communication system, the verbal command string including a first verbal command and a second verbal command, wherein the first command includes a selection of a communication device for establishing the wireless mobile communication link and the second command includes a selection of a phone number;
   determining the selected communication device is not communicatively connected to the vehicle communication system;
   issuing a notification identifying alternate communication devices that are communicatively connected to the vehicle system;
   receiving a verbal command detectable by the vehicle communication system for selecting one of the identified alternate communication devices for establishing the wireless mobile communication link; and
   establishing the wireless mobile communication link using the selected communication device and the selected phone number.

9. The method of claim 8, wherein the notification is an audible notification.

10. The method of claim 8, wherein the notification is a visual notification.

11. The method of claim 8, wherein the selected communication device includes a mobile communication device communicatively connected to the vehicle communication system.

12. The method of claim 8, wherein the selected communication device includes a mobile communication system integrated with the vehicle communication system.

13. The method of claim 8, wherein the mobile network includes a cellular network.

14. A system for establishing a wireless mobile communication link, comprising:
   a plurality of communication devices, wherein at least one of the plurality of communication devices is communicatively connected to a vehicle communication system; and
   a processor including a non-transitory computer-readable medium having instructions stored thereon that, when executed by the processor, perform operations in a vehicle, the operations comprising:
      receiving a selection of one of the plurality of communication device for establishing the wireless mobile communication link;
      determining the selected communication device is not communicatively connected to the vehicle communication system; and
      issuing a notification identifying alternate communication devices, the alternate communication devices being communicatively connected to the vehicle communication system.

15. The system of claim 14, wherein the operations further comprise:
   establishing the wireless mobile communication link using one of the alternate communication devices.

16. The system of claim 14, the operations further comprising:
   receiving a verbal command detectable by the vehicle communication system for selecting one of the identified alternate communication devices for establishing the wireless mobile communication link; and establishing the wireless mobile communication link using the selected alternate communication device.

17. The system of claim 14, further comprising:
at least one of a speaker or an interactive display, wherein issuing the notification identifying the alternate communication devices comprises:
issuing a notification on the at least one of the speaker or the interactive display, the notification identifying an alternate communication devices, the alternate communication devices being communicatively connected to the vehicle communication system.

18. The system of claim 14, further comprising:
a microphone, wherein receiving the selection of the one of the plurality of communication devices for establishing the wireless mobile communication link comprises receiving, using the microphone, a verbal command including a selection one of the plurality of communication devices for establishing the wireless mobile communication link.

19. The system of claim 14, wherein the verbal command comprises a single continuous user verbal command including a first verbal command, and at least a second verbal command, further wherein the first verbal command includes the selection of the one of the plurality of communication devices for establishing the wireless mobile communication link.

20. The system of claim 14, wherein the plurality of communication devices includes at least one of a mobile communication device or an integrated mobile communication system.

* * * * *